Jan. 10, 1933.  S. G. MALBY  1,893,711
METHOD OF MAKING VALVE CASINGS
Filed April 27, 1931
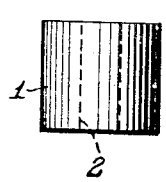
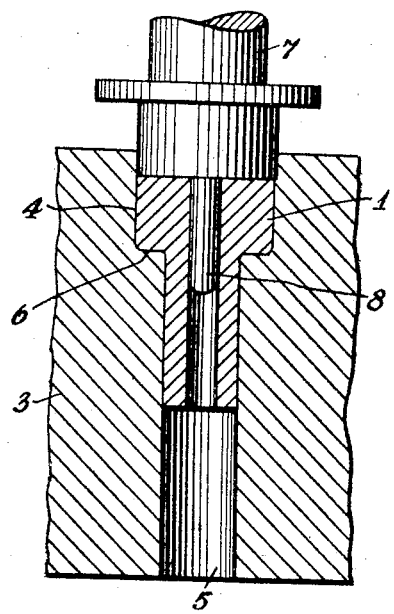
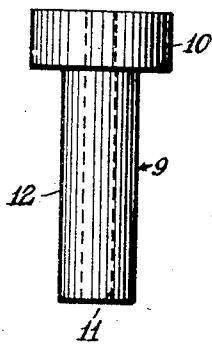
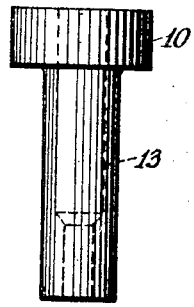
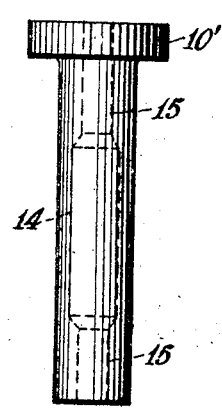
INVENTOR
ATTORNEY Patented Jan. 10, 1933

1,893,711

UNITED STATES PATENT OFFICE

SETH G. MALBY, OF TENAFLY, NEW JERSEY, ASSIGNOR TO ALUMINUM COMPANY OF AMERICA, OF PITTSBURGH, PENNSYLVANIA, A CORPORATION OF PENNSYLVANIA

METHOD OF MAKING VALVE CASINGS

Application filed April 27, 1931. Serial No. 533,127.

This invention relates to valves for pneumatic tires and the like and more particularly to a method of manufacturing the casings thereof.

The valve casings which are used at the present time are usually constructed with a cylindrical barrel portion and a flanged head in the form of a T having a central internal bore or cavity of large diameter and end bores of lesser diameter connecting with the aforesaid central cavity. The outer end of the casing opposite the flanged end receives the working parts of the assembled valve.

Prior to this invention, tire valve casings were manufactured by extruding a portion of a cylindrical blank with the aid of a former to produce a flanged tubular member, the flange being that portion of the blank which was not extruded. The bore in the unextruded portion or flange was then reduced by another extrusion operation which was also carried out with the aid of a former, said former, however, being of a smaller size than the former employed in the initial extrusion operation.

This process, as is apparent from the foregoing, required the use of two formers of different size which served to make the process somewhat more expensive than the process which utilized a single former.

I have found that I can prepare valve casings of the type above mentioned more economically by extruding a slug, with the aid of a former, to form a flanged tubular member, the flange consisting of an unextruded portion, enlarging the bore in the flange, and preferably also a portion of the bore extending through the body member, by any suitable operation, such as drilling or boring, and then extruding the flange with the aid of the former employed in the first operation, whereby a restricted bore is produced in the flange and the portion extruded therefrom.

It is therefore an object of this invention to provide a method of producing tire valve casings wherein a single former is employed.

Another object of this invention is to provide a method of producing valve casings which comprises extruding a slug with the aid of a former to produce a flanged tubular member, the flange consisting of an unextruded portion, enlarging the bore through the flange, and preferably also a portion of the bore in the body member, and then extruding the flange with the aid of the former used in the first operation, whereby the bore through the flange and the portion of the member extruded therefrom in the second operation is restricted.

Other objects will appear from the following description, appended claims and accompanying drawing forming a part of this specification and in which:

Figure 1 illustrates a slug suitable for the manufacture of a valve casing;

Figure 2 diagrammatically illustrates a suitable punch and die mechanism illustrating the first step of the process;

Figure 3 is a front elevation of a flanged tubular blank resulting from the first extrusion operation;

Figure 4 illustrates the flanged tubular member at the end of the second operation; and Figure 5 illustrates the flanged tubular member or casing after the second extrusion operation.

Referring to the drawing wherein like reference numerals designate like parts, the reference numeral 1 designates a cylindrical slug, preferably provided with a central bore 2, which may be used in this process. The slug 1 is disposed in the die 3 which is provided with a receiving socket 4 and a central die hole 5, the diameter of which is the same as that required in the finished casing. The socket 4 is of such a diameter as to closely fit the slug 1 which is disposed therein and seated on the shoulder 6 between said socket 4 and the die hole 5. Cooperating with the die 3 is a punch 7 provided with a former 8 projecting from the end thereof and axially aligned with the die hole 5, which is caused to descend in any well known manner whereby the slug 1 is extruded to form the flanged tubular blank 9 illustrated in Figure 3. The flange 10 thereof consists of that portion of the slug which was not extruded, and the bore 11, which is of uniform diameter, extends throughout the blank 9. At the end of this operation the blank 9 is preferably removed from the die 3 and the bore 11, particularly that portion thereof which extends through the flange 10 and, preferably, also through a portion of the body 12 of the blank 9, is enlarged as designated by the reference numeral 13 in any suitable or well known manner, as for instance, by drilling, boring, punching, and the like. Finally, the resultant flanged tubular member is replaced in the die 3 and subjected to a second extrusion operation wherein the former 8 and die mechanism 3 are employed. The second extrusion operation is carried out until the flanged casing illustrated in Figure 5 is obtained. In other words, the second extrusion operation extrudes a portion of the flange 10, forming the flange 10', and restricting or reducing the enlarged bore 13 extending through the flange and the portion extruded therefrom. The flanged tubular member, which at the end of this operation (see Figure 5) has an enlarged cavity 14 communicating with passages 15 of equal diameter at both ends thereof, is then subjected to the threading and other mechanical operations necessary to produce the finished casing.

From the above it is apparent that I have provided a simple, easy and economical method of producing a tubular member, having a central internal bore or cavity of large diameter and end bores of lesser diameter connecting with said central bore, a particular form of which forms a tire valve casing. The use of the identical extruding mechanism in all of the extrusion operations, as contemplated by this process, eliminates the necessity of utilizing two or more extruding mechanisms.

Since it is obvious that various changes may be made in the specific details hereinabove set forth, this invention is not restricted thereto except as set forth in the appended claims.

I claim:

1. A method of producing a tubular member, which comprises extruding a slug to form a flanged tubular member, the flange consisting of unextruded material, enlarging the bore through a portion of said member, and then extruding the flange so as to reduce the diameter of the bore therethrough.

2. A method of producing a tubular member, which comprises extruding a slug to form a flanged tubular member, the flange consisting of unextruded material, enlarging the bore extending through said flange and a portion of said member, and then extruding the flange so as to reduce the diameter of the bore therethrough.

3. A method of producing a tubular member, which comprises extruding a slug with the aid of a former to form a flanged tubular member, the flange consisting of unextruded material, enlarging the bore through said flange, and then extruding the flange with the aid of the former employed in the first extrusion operation so as to reduce the diameter of the bore through the flange.

4. A method of producing a tubular member, comprising extruding a slug with the aid of a former to form a flanged tubular member, the flange consisting of unextruded material, enlarging the bore extending through said flange and a portion of said member, and then extruding said flange with the aid of the former employed in the first extrusion operation so as to reduce the diameter of the bore through the flange to the same diameter as the bore at the end opposite from the flange.

5. A method of producing a tubular member, comprising extruding a slug with the aid of a former to form a flanged tubular member, the flange consisting of unextruded material, drilling an enlarged bore through said unextruded material, and then extruding the flange with the aid of the former employed in the first extrusion operation, whereby the bore is restricted.

6. A method of producing a tubular member having a central internal bore or cavity of large diameter and end bores of lesser diameter connecting with said central bore, comprising extruding a slug to form a flanged tubular member, the flange consisting of unextruded material, enlarging the bore through a portion of said member, and then extruding the flange so as to reduce the bore therethrough to a less diameter than said central internal bore.

7. A method of producing a valve casing, which comprises extruding a slug with the aid of a former to form a flanged tubular member, the flange consisting of unextruded material, enlarging the bore through a portion of said member, and then partially extruding the flange with the aid of the former employed in the first extrusion operation so as to reduce the diameter of the bore through the flange.

8. In a method of producing a tubular member having a central internal bore or cavity of large diameter and end bores of lesser diameter connecting with said central bore, the steps of partially extruding a slug to form a flanged tubular member, machining an enlarged bore through a portion of said tubular member, and further extruding said flange and restricting the bore therethrough.

9. In a method of producing a tubular member having a central internal bore or cavity of large diameter and end bores of lesser diameter connecting with said central bore, the steps of partially extruding a slug with the aid of a former to form a flanged tubular member, the flange consisting of unextruded material, machining an enlarged bore through a portion of said flanged member, and further extruding the flange with the aid of the former employed in the first extrusion operation and restricting the bore therethrough.

In testimony whereof, I have affixed my signature to this specification.

SETH G. MALBY.